US012772160B2

(12) United States Patent
Liang et al.

(10) Patent No.: US 12,772,160 B2
(45) Date of Patent: Oct. 20, 2026

(54) METHOD FOR NETWORK SELECTION BASED ON SLICE INFORMATION

(71) Applicant: ZTE CORPORATION, Shenzhen (CN)

(72) Inventors: Shuang Liang, Shenzhen (CN); Jinguo Zhu, Shenzhen (CN); Menghan Wang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 267 days.

(21) Appl. No.: 18/645,464

(22) Filed: Apr. 25, 2024

(65) Prior Publication Data

US 2024/0349177 A1 Oct. 17, 2024

Related U.S. Application Data

(63) Continuation of application No. PCT/CN2022/085225, filed on Apr. 5, 2022.

(51) Int. Cl.

| | |
|---|---|
| ***H04W 48/18*** | (2009.01) |
| ***H04W 8/20*** | (2009.01) |
| ***H04W 60/04*** | (2009.01) |
| *H04W 84/04* | (2009.01) |

(52) U.S. Cl.

CPC ............. *H04W 48/18* (2013.01); *H04W 8/20* (2013.01); *H04W 60/04* (2013.01); *H04W 84/042* (2013.01)

(58) Field of Classification Search

CPC ..... H04W 76/10; H04W 36/06; H04W 48/18; H04W 8/02

See application file for complete search history.

(56) References Cited

U.S. PATENT DOCUMENTS

| | | | | |
|---|---|---|---|---|
| 2019/0200209 | A1* | 6/2019 | Velev .................... | H04W 48/00 |
| 2021/0337383 | A1 | 10/2021 | Faccin | |

FOREIGN PATENT DOCUMENTS

| | | | |
|---|---|---|---|
| CN | 109964509 | A | 7/2019 |
| CN | 112543491 | A | 3/2021 |
| CN | 112672383 | A | 4/2021 |

(Continued)

OTHER PUBLICATIONS

3rd Generation Partnership Project; Technical Specification Group Services and System Aspects; System architecture for the 5G System (5GS); Stage 2 (Release 17), 3GPP TS 23.501 V17.4.0 (Mar. 2022), 567 pages.

(Continued)

*Primary Examiner* — Sulaiman Nooristany
(74) *Attorney, Agent, or Firm* — Foley & Lardner LLP

(57) ABSTRACT

A wireless communication method for use in a wireless network node is disclosed. The method comprises providing prioritization information of at least one of Visitor Public Land Mobile Networks (VPLMNs) or access technology with which a wireless terminal registers for at least one intended Single-network slice Selection Assistant Information (S-NSSAI), in first intended network slice Selection Assistant Information (NSSAI) of the wireless terminal, and transmitting a subscription request for a notification associated with the wireless terminal initiating a registration request comprising second intended NSSAI.

16 Claims, 10 Drawing Sheets

(56) References Cited

FOREIGN PATENT DOCUMENTS

| | | | | | |
|---|---|---|---|---|---|
| CN | 114071576 | A | | 2/2022 | |
| WO | WO-2021223507 | A1 | * | 11/2021 | ............ H04W 60/04 |

OTHER PUBLICATIONS

Ericsson, "Access Type Report for a MA PDU session", 3GPP TSG-CT WG3 Meeting #109e, C3-202255, Apr. 24, 2020, E-Meeting (12 pages).
Extended European Search Report for EP Appl. No. 22936078.9, dated Dec. 19, 2024 (11 pages).
International Search Report and Written Opinion for PCT Appl. No. PCT/CN2022/085225, mailed on Nov. 29, 2022 (6 pages).

* cited by examiner

METHOD FOR NETWORK SELECTION BASED ON SLICE INFORMATION

CROSS-REFERENCE TO RELATED PATENT APPLICATIONS

This application is a Continuation of PCT Application No. PCT/CN2022/085225, filed Apr. 5, 2022, incorporated herein by reference in its entirety.

TECHNICAL FIELD

This document is directed generally to wireless communications, and in particular to 5th generation (5G) communications.

BACKGROUND

In a scenario, a roaming user equipment (UE) may stay in an area covered by different public land mobile networks (PLMNs) and each PLMN provides different services via different network slices. In addition, the UE has subscribed to access several services.

SUMMARY

When the roaming UE activates a service/application requiring a Network Slice which is not offered by a serving visitor PLMN (VPLMN), the requirement for the Network Slice for the service/application may be rejected by the serving VPLMN. However, the network slice required by the service/application may be available in other VPLMNs. Thus, how a home-PLMN (HPLMN) of the UE provides the UE with information of accessing the VPLMNs/access technology with which the UE may register for a particular Network Slice needs to be discussed.

The present disclosure relates to methods, systems, and devices for network selection based on slice information.

In an aspect, the present disclosure relates to a wireless communication method for use in a wireless network node. The method comprises:

- providing prioritization information of at least one of Visitor Public Land Mobile Networks, VPLMNs, or access technology with which a wireless terminal registers for at least one intended Single-network slice Selection Assistant Information, S-NSSAI, in first intended network slice Selection Assistant Information, NSSAI, of the wireless terminal, and
- transmitting a subscription request for a notification associated with the wireless terminal initiating a registration request comprising second intended NSSAI.

Various embodiments may preferably implement the following features:

Preferably or in some embodiments, the second intended NSSAI is different from the first intended NSSAI.

Preferably or in some embodiments, the wireless network node comprises an application function in a Home Public Land Mobile Network, HPLMN, of the wireless terminal, wherein the prioritization information is provided to and the subscription request is transmitted to a unified data management in the HPLMN.

Preferably or in some embodiments, the wireless network node comprises a Network Slice Selection Function, NSSF, in a Home Public Land Mobile Network, HPLMN, of the wireless terminal, wherein the prioritization information is provided to and the subscription request is transmitted to an NSSF in a VPLMN serving the wireless terminal.

Preferably or in some embodiments, the wireless communication method further comprises receiving, from the NSSF in the VPLMN serving the wireless terminal, at least one S-NSSAI of the HPLMN corresponding to the at least one intended S-NSSAI.

Preferably or in some embodiments, the wireless network node comprises a Policy Control Function, PCF, in a Home Public Land Mobile Network, HPLMN, of the wireless terminal, wherein the prioritization information is provided to and the subscription request is transmitted to a PCF in a VPLMN serving the wireless terminal.

Preferably or in some embodiments, the wireless communication method further comprises receiving, from the PCF in the VPLMN serving the wireless terminal, at least one S-NSSAI of the HPLMN corresponding to the at least one intended S-NSSAI.

Preferably or in some embodiments, the prioritization information is provided to and the subscription request is transmitted to an access and mobility management function, AMF, in a VPLMN serving the wireless terminal.

Preferably or in some embodiments, the wireless network node comprises a unified data management in an HPLMN of the wireless terminal or a network function configured to manage the prioritization information.

Preferably or in some embodiments, the wireless network node comprises a unified data management in an HPLMN of the wireless terminal, wherein the method further comprises receiving, from an application function in the HPLMN, the subscription request.

Preferably or in some embodiments, the wireless communication method further comprises:

- receiving, from the AMF, at least one S-NSSAI of the HPLMN corresponding to the at least one intended S-NSSAI, or
- receiving, from the AMF, the at least one intended S-NSSAI and at least one S-NSSAI of the HPLMN corresponding to the at least one intended S-NSSAI.

Preferably or in some embodiments, the wireless network node comprises an NSSF in the VPLMN serving the wireless terminal or a PCF in the VPLMN serving the wireless terminal.

Preferably or in some embodiments, the wireless communication method further comprises transmitting, to a home network function in an HPLMN of the wireless terminal, at least one S-NSSAI of the HPLMN corresponding to the at least one intended S-NSSAI, wherein the home network function is a PCF and the wireless network node comprises the PCF in the VPLMN serving the wireless terminal, or the home network function is an NSSF and the wireless network node comprises the NSSF in the VPLMN serving the wireless terminal.

Preferably or in some embodiments, the wireless communication method further comprises receiving, from a home network function in an HPLMN of the wireless terminal, the subscription request, wherein the home network function is a PCF and the wireless network node comprises the PCF in the VPLMN serving the wireless terminal, or the home network function is an NSSF and the wireless network node comprises the NSSF in the VPLMN serving the wireless terminal.

Preferably or in some embodiments, the first intended NSSAI and/or the second intended NSSAI comprises at least one allowed S-NSSAI allowed by a VPLMN serving the wireless terminal and/or at least one configured S-NSSAI for the VPLMN serving the wireless terminal.

Preferably or in some embodiments, the first intended NSSAI and/or the second intended S-NSSAI comprises at least one rejected S-NSSAI rejected by a VPLMN serving the wireless terminal and/or a registration area of the wireless terminal.

Preferably or in some embodiments, the at least one intended S-NSSAI comprises at least one rejected S-NSSAI rejected by a VPLMN serving the wireless terminal and/or a registration area of the wireless terminal.

Preferably or in some embodiments, the at least one intended S-NSSAI comprises all of S-NSSAIs requested by the wireless terminal.

In another aspect, the present disclosure relates to a wireless communication method for use in an access and mobility management function in a Visitor Public Land Mobile Network, VPLMN, serving a wireless terminal. The method comprises:

- receiving, from a wireless network node, prioritization information of at least one of VPLMNs, or access technology with which the wireless terminal registers for at least one intended Single-network slice Selection Assistant Information, S-NSSAI, in first intended network slice Selection Assistant Information, NSSAI, of the wireless terminal, and
- receiving, from the wireless network node, a subscription request for a notification associated with the wireless terminal initiating a registration request comprising second intended NSSAI.

Various embodiments may preferably implement the following features:

Preferably or in some embodiments, the second intended NSSAI is different from the first intended NSSAI.

Preferably or in some embodiments, the wireless network node comprises a unified data management in an HPLMN of the wireless terminal or a network function configured to manage the prioritization information.

Preferably or in some embodiments, the wireless communication method further comprises:

- transmitting, to the wireless network node, at least one S-NSSAI of the HPLMN corresponding to the at least one intended S-NSSAI, or
- transmitting, to the wireless network node, the at least one intended S-NSSAI and at least one S-NSSAI of the HPLMN corresponding to the at least one intended S-NSSAI.

Preferably or in some embodiments, the wireless communication method further comprises mapping each of the at least one intended S-NSSAI to the corresponding S-NSSAI of the HPLMN of the wireless terminal.

Preferably or in some embodiments, the wireless network node comprises an NSSF in a VPLMN serving the wireless terminal or a PCF in the VPLMN serving the wireless terminal.

Preferably or in some embodiments, the wireless communication method further comprises transmitting, to the wireless network node, at least one S-NSSAI of the HPLMN corresponding to the at least one intended S-NSSAI.

Preferably or in some embodiments, the wireless communication method further comprises receiving, from the wireless terminal, the first intended NSSAI.

Preferably or in some embodiments, the first intended NSSAI and/or the second intended NSSAI comprises at least one allowed S-NSSAI allowed by the VPLMN serving the wireless terminal and/or at least one configured S-NSSAI for the VPLMN serving the wireless terminal.

Preferably or in some embodiments, the first intended NSSAI and/or the second intended S-NSSAI comprises at least one rejected S-NSSAI rejected by the VPLMN serving the wireless terminal and/or a registration area of the wireless terminal.

Preferably or in some embodiments, the at least one intended S-NSSAI comprises at least one rejected S-NSSAI rejected by the VPLMN serving the wireless terminal and/or a registration area of the wireless terminal.

Preferably or in some embodiments, the at least one intended S-NSSAI comprises all of S-NSSAIs requested by the wireless terminal.

In yet another aspect, the present disclosure relates to a wireless network node. The wireless network node comprises:

- a processor, configured to provide prioritization information of at least one of Visitor Public Land Mobile Networks, VPLMNs, or access technology with which a wireless terminal registers for at least one intended Single-network slice Selection Assistant Information, S-NSSAI, in first intended network slice Selection Assistant Information, NSSAI, of the wireless terminal, and
- a communication unit, configured to transmit a subscription request for a notification associated with the wireless terminal initiating a registration request comprising second intended NSSAI.

Various embodiments may preferably implement the following feature:

Preferably or in some embodiments, the processor is further configured to perform any of aforementioned wireless communication methods.

In still another aspect, the present disclosure relates to an access and mobility management function in a Visitor Public Land Mobile Network, VPLMN, serving a wireless terminal. The access and mobility management function comprises:

- a communication unit, configured to:
- receive, a wireless network node, prioritization information of at least one of VPLMNs, or access technology with which the wireless terminal registers for at least one intended Single-network slice Selection Assistant Information, S-NSSAI, in first intended network slice Selection Assistant Information, NSSAI, of the wireless terminal, and
- receive, from the wireless network node, a subscription request for a notification associated with the wireless terminal initiating a registration request comprising second intended NSSAI.

Various embodiments may preferably implement the following feature:

Preferably or in some embodiments, the access and mobility management function further comprises a processor configured to perform any of aforementioned wireless communication methods.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

In the present disclosure, the Network Slice is a logical network that provides specific network capabilities and network characteristics. In addition, Network Slice instance refers to a set of Network Function instances and the required resources (e.g., compute, storage and networking resources) which form a deployed Network Slice.

In the present disclosure, Network Slice Selection Assistance information (NSSAI) comprises at least one single-NSSAI (S-NSSAI) and is sent to the network from the UE to assist the network in selecting a particular Network Slice.

Figure 1:
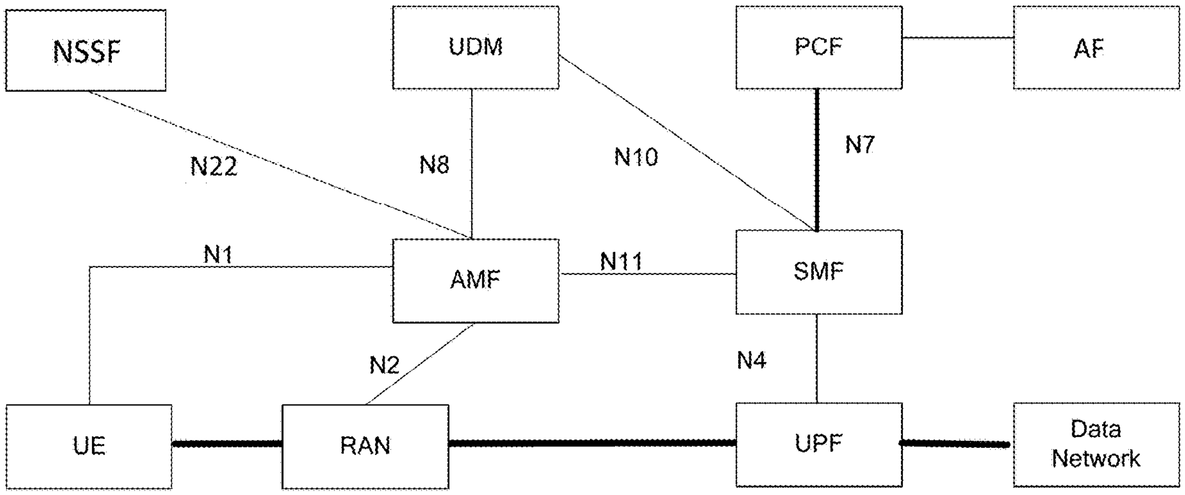
FIG. 1 shows a schematic diagram of a network according to an embodiment of the present disclosure.

FIG. 1 shows a schematic diagram of a network (architecture) according to an embodiment of the present disclosure. In FIG. 1, the network comprises the following network functions/entities:

1) UE: User Equipment

2) RAN: Radio Access Network

In the present disclosure, the RAN may be equal to RAN node or next-generation RAN (NG-RAN) (node).

3) AMF: Access and Mobility Management Function

The AMF includes the following functionalities: Registration Management, Connection Management, Reachability Management and Mobility Management. The AMF terminates the RAN Control Plane (CP) interface N2 and NAS interface N1, non-access stratum (NAS) ciphering and integrity protection. It also distributes the session management (SM) NAS to proper session management functions (SMFs) via interface N11.

During a registration procedure, the AMF may determine Allowed NSSAI, Rejected NSSAI with rejection cause based on Requested NSSAI received from the UE. The AMF further determines the Registration Area within which the UE can use all S-NSSAIs of the Allowed NSSAI. The AMF sends the Allowed NSSAI, the Rejected NSSAI with rejection cause and the Registration Area to the UE.

4) UDM: Unified Data Management

The UDM manages subscription profile for UEs. The subscription data is stored in the Unified Data Repository (UDR). The subscription information includes the data used for Mobility Management and Session Management. The AMF and session management function SMF retrieve the subscription data from the UDM.

5) NSSF: Network Slice Selection Function.

The NSSF supports the following functionality: selecting the set of Network Slice instances serving the UE; determining the Allowed NSSAI and, if needed, the mapping to the HPLMN S-NSSAIs; determining the Configured NSSAI and, if needed, the mapping to the HPLMN S-NSSAIs; determining the AMF Set to be used to serve the UE, or, based on configuration, a list of candidate AMF(s), possibly by querying the Network Repository Function (NRF).

In the case of home-routed roaming, there are two main options dependent on the operators' choices in terms of involvement of the NRF, the NSSF and a configuration of the AMF. One option is that HPLMN and VPLMN deploy the NSSF separately, wherein the NSSF in the VPLMN is called vNSSF and the NSSF in the HPLMN is called hNSSF.

6) SMF: Session Management Function

The SMF includes the following functionalities: session establishment, modification and release, UE IP address allocation & management (including optional authorization functions), selection and control of User Plane (UP) function, downlink data notification. The SMF can subscribe to the mobility related events and information from AMF.

7) UPF: User Plane Function

The UPF includes the following functionalities: serving as an anchor point for intra-/inter-radio access technology (RAT) mobility and the external session point of interconnect to Data Network, packet routing & forwarding as indicated by SMF, traffic usage reporting, quality of service (QOS) handling for the UP, downlink packet buffering and downlink data notification triggering, etc.

8) AF: Application Function

The AF interacts with the 3GPP Core Network in order to provide services, for example to support: application influence on traffic routing, accessing NEF, interacting with the policy framework for policy control, etc.

9) PCF: Policy Control Function

The PCF supports unified policy framework to govern network behavior. The PCF provides access management policy to the AMF, or session management policy to the SMF, and/or UE policy to the UE. The PCF can access the UDR to obtain subscription information relevant for policy decisions. The PCF may also generate the policy to govern network behavior based on the subscription and indication from an application function (AF). Then, the PCF can provide policy rules to CP functions (e.g., the AMF and/or the SMF) to enforce the CP functions.

Figure 2:
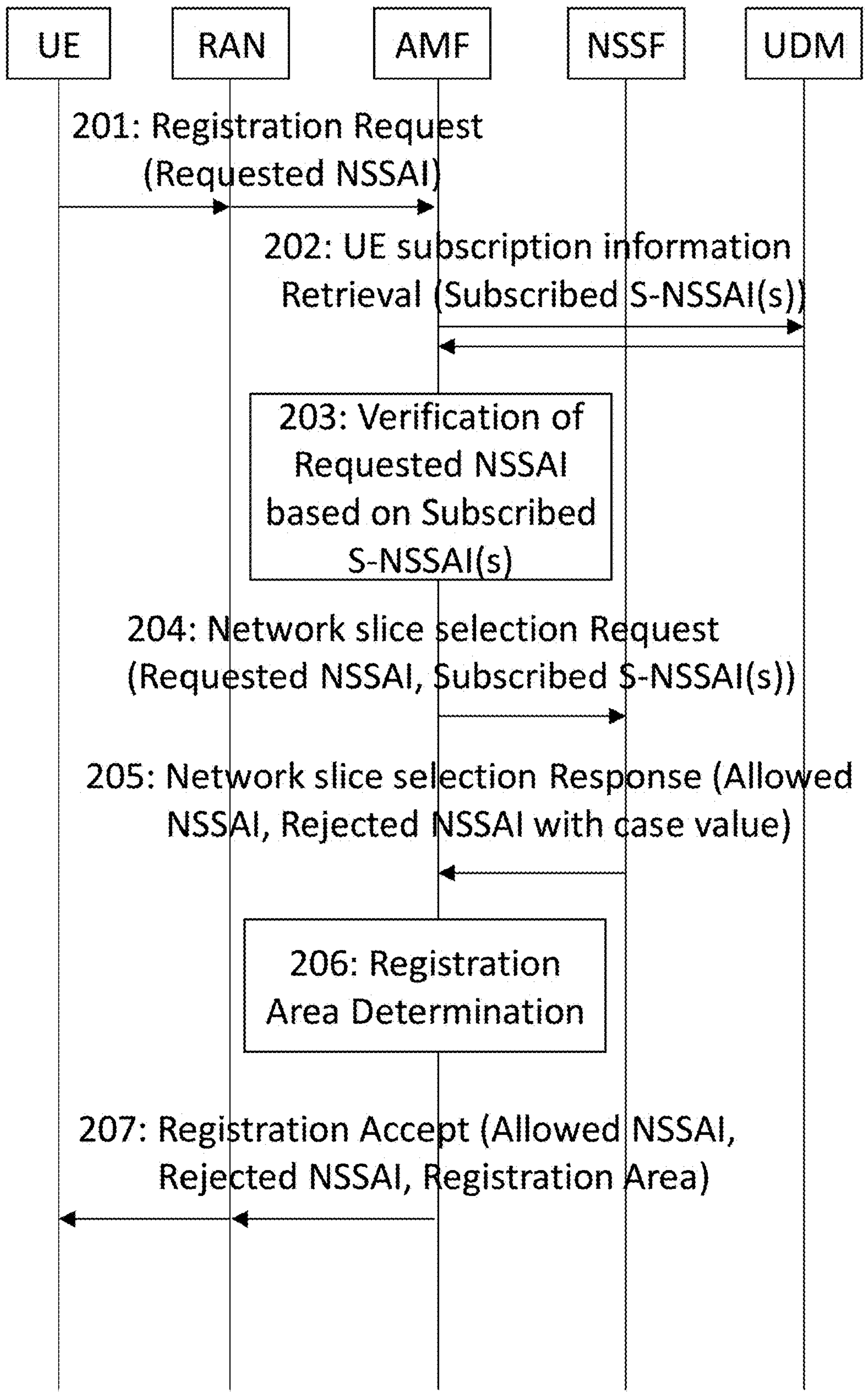
FIG. 2 shows a schematic diagram of a registration procedure according to an embodiment of the present disclosure.

FIG. 2 shows a schematic diagram of a registration procedure of a UE registering to a set of Network Slices according to an embodiment of the present disclosure. FIG. 2 comprises the following steps:

Step 201: When a UE registers over an Access Type with a serving PLMN, the UE provides, to the network in the NAS layer, a Requested NSSAI containing S-NSSAI(s) corresponding to the Network Slice(s) to which the UE intends to register in a Registration Request.

In an embodiment, the Requested NSSAI is one of:

The Default Configured NSSAI, i.e., if the UE has neither Configured NSSAI nor an Allowed NSSAI for the serving PLMN;

The Configured-NSSAI, or a subset thereof, e.g., if the UE has no Allowed NSSAI for the Access Type for the serving PLMN;

The Allowed-NSSAI for the Access Type over which the Requested NSSAI is sent, or a subset thereof; or The Allowed-NSSAI for the Access Type over which the Requested NSSAI is sent, or a subset thereof, plus one or more S-NSSAIs from the Configured-NSSAI not yet in the Allowed NSSAI for the Access Type.

Step 202: After the AMF selected by the RAN during the Registration Procedure receives the Registration Request from the UE, the AMF may query the UDM to retrieve UE subscription information including the Subscribed S-NSSAIs.

Step 203: The AMF verifies whether the S-NSSAI(s) in the Requested NSSAI are permitted based on the Subscribed S-NSSAIs. To identify the Subscribed S-NSSAIs, the AMF may use mapped HPLMN S-NSSAIs provided by the UE in the NAS message, for each S-NSSAI of the Requested NSSAI.

Step 204: When the UE context in the AMF does not yet include an Allowed NSSAI for the corresponding Access Type, the AMF queries the NSSF for network slice selection, except for the case when the AMF is allowed to determine whether it can serve the UE based on configuration in this AMF. The internet protocol (IP) address or a fully qualified domain name (FQDN) of the NSSF is locally configured in the AMF.

Step 205: The NSSF returns the AMF with the Allowed NSSAI. The NSSF may also return the AMF with the Rejected S-NSSAI(s) with a rejection cause indicating the reason why the S-NSSAI(s) has been rejected, e.g., rejected NSSAI for the current PLMN, rejected NSSAI for the current Registration Area, etc.

Step 206: The AMF may determine a Registration Area such that all S-NSSAIs in the Allowed NSSAI are available in all Tracking Areas of the Registration Area.

Step 207: The AMF sends a Registration Accept message to the UE including the Allowed NSSAI and the mapped HPLMN NSSAI of the Allowed NSSAI if provided, the Rejected S-NSSAI(s) with rejection cause and the Registration Area.

After completion of the Registration procedure, the UE may request to establish a PDU Session. The Requested S-NSSAI of the PDU Session is derived from UE Route Selection Policy (URSP) rules or UE Local Configuration. In an embodiment, the Requested S-NSSAI is within the Allowed NSSAI.

For a roaming UE activating a service/application requiring a Network Slice which is not offered by the serving VPLMN and is available in the area from other VPLMN(s), it is unclear that how this UE re-selects another VPLMN based on the UE preference, service/application and etc.). The present disclosure provides a mechanism to ensure that the HPLMN can provide the UE with prioritization information of the VPLMNs/access technology with which the UE may register for the intended Network Slice(s).

In an embodiment, the VPLMN may support several access technologies and the Network Slice supported by each access technology may be different. Thus, the prioritization information of VPLMNs/access technology may be the VPLMNs/access technology prioritization or VPLMNs/access technology combination prioritization.

The present disclosure provides four alternative ways for the HPLMN to provide the UE with the prioritization information of the VPLMNs/access technology with which the UE may register for the intended Network Slice(s).

Figure 3:
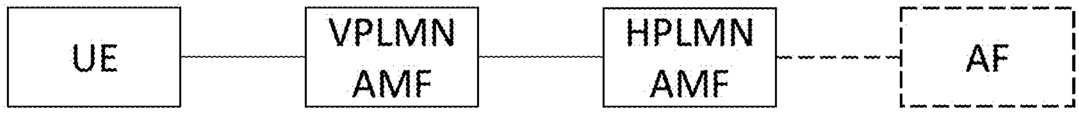
FIG. 3 shows a schematic diagram of a network according to an embodiment of the present disclosure.

In an embodiment, the prioritization information of the VPLMNs/access technology is provided by the UDM/AF. FIG. 3 shows a schematic diagram of the network (architecture) for this embodiment and FIG. 4 show a schematic diagram of a registration procedure when the prioritization information of the VPLMNs/access technology is provided by UDM/AF.

Note that the AF in FIG. 3 may be deployed in the HPLMN and used for the VPLMNs/access technology prioritization management. The AF may be optionally deployed for network operators. If the AF is not deployed, the VPLMNs/access technology prioritization information is managed by the UDM/UDR.

In addition, Steering-of-Roaming-AF (SoR-AF) is an existing NF for the VPLMNs/access technology prioritization management. However, the SoR does not consider the slice information supported in different VPLMNs/access technologies. The SoR-AF may be enhanced for the VPLMNs/access technology prioritization management based on slice information. In an embodiment, a new AF/NF may be introduced to perform the VPLMNs/access technology prioritization management based on slice information. That is the AF mentioned below may be either an enhanced SoR-AF or a new AF/NF.

Figure 4:
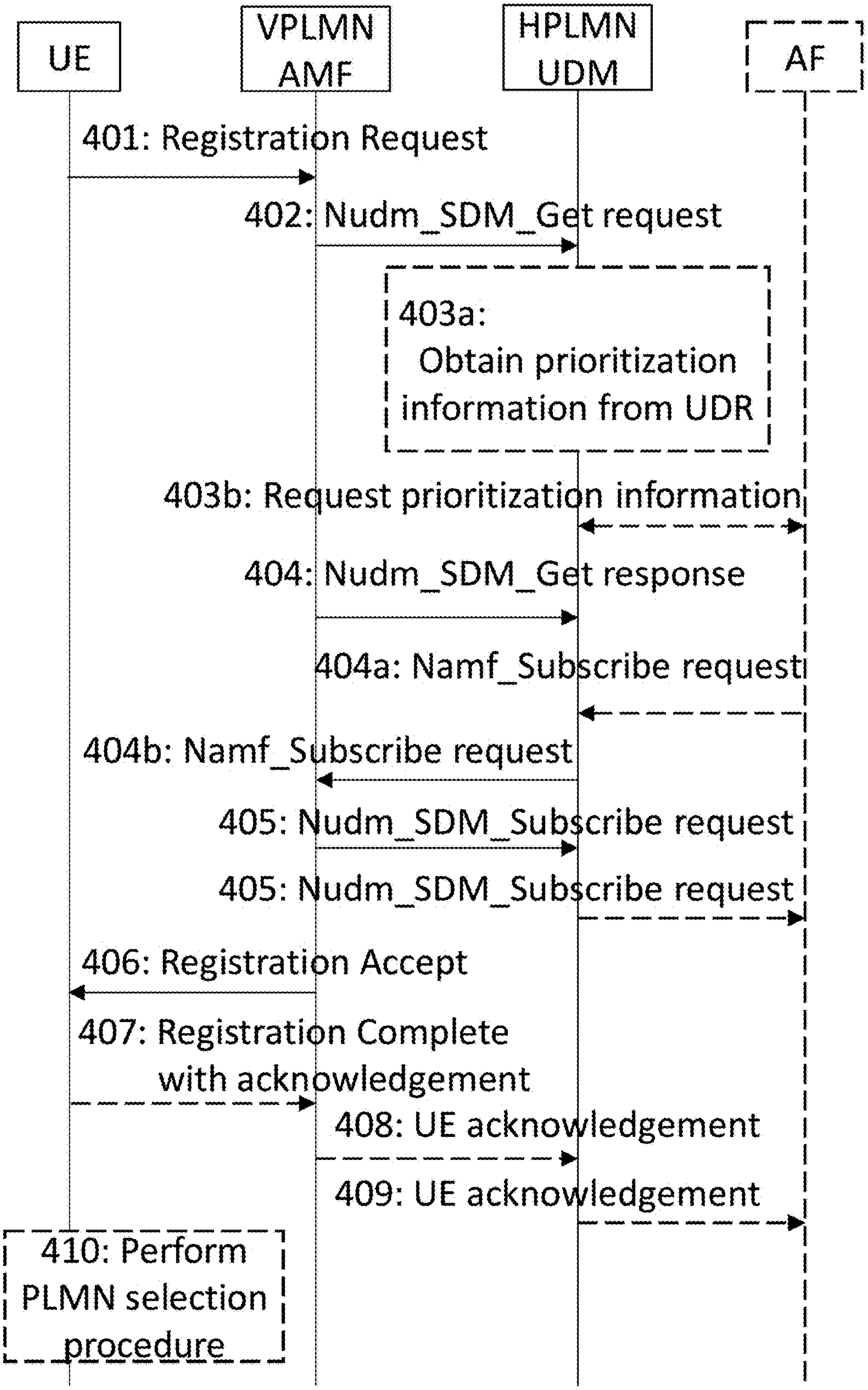
FIG. 4 show a schematic diagram of a registration procedure according to an embodiment of the present disclosure.

Specifically, the registration procedure shown in FIG. 4 comprises the following steps:

Step 401: The UE to the VPLMN AMF

The UE initiates an initial registration, an emergency registration or a mobility registration update procedure to the VPLMN AMF by sending a REGISTRATION REQUEST message with the 5GS registration type information element (IE) indicating “initial registration”, “emergency registration” or “mobility registration updating”.

The UE includes the requested NSSAI containing the S-NSSAI(s) corresponding to the slice(s) to which the UE intends to register with and includes the mapped S-NSSAI(s) for the requested NSSAI, if available, in the REGISTRATION REQUEST message. The UE may indicate that it supports PLMN reselection based on prioritization information of the VPLMNs/access technology with which the UE may register for the intended network slice(s) in the REGISTRATION REQUEST message.

The UE includes all the S-NSSAIs associated to network slices which the UE intends to register with in the REGISTRATION REQUEST message. There are two options to provide such S-NSSAIs to the network:

Option 1:

The UE may include the intended S-NSSAI(s) in the Requested NSSAI, i.e., the existing IE, and an extended (new) IE in the REGISTRATION REQUEST message. The Requested NSSAI includes the intended S-NSSAIs which are allowed by the serving PLMN or in the Configured NSSAI for the serving PLMN. In this option, an extended (new) IE includes the intended S-NSSAIs, which, e.g., were rejected for the current PLMN and/or rejected for the current Registration Area.

Option 2:

The UE may include all the intended S-NSSAIs in the Requested NSSAI or an extended (new) IE in the REGISTRATION REQUEST message.

Step 402: VPLMN AMF to the HPLMN UDM

Upon receiving the REGISTRATION REQUEST message, the VPLMN AMF executes a defined registration procedure. As part of the registration procedure, the VPLMN AMF invokes Nudm_SDM_Get service operation(s) to the HPLMN UDM to retrieve the prioritization information of the VPLMNs/access technology. Note that a new service operation may be introduced or the existing service operation (e.g., Nudm_SDM_Get service operation or Nudm_SDM_Info service operation) may be reused to provide the slice information to the UDM.

In an embodiment, the slice information provided by the AMF may not comprise the S-NSSAI(s) which is not allowed by the subscription data of the UE. That is the S-NSSAI(s) which is not allowed by the subscription data of the UE may be excluded from the slice information.

In an embodiment, the S-NSSAI(s) in the slice information provided by the AMF is the HPLMN S-NSSAI(s). In other words, if the S-NSSAI(s) comprised in the REGISTRATION REQUEST message is the VPLMN S-NSSAI(s), the AMF needs to map the VPLMN S-NSSAI(s) to the HPLMN S-NSSAI(s) before providing the slice information.

In an embodiment, there are 3 options for providing the intended S-NSSAIs to the home network:

Option A: The AMF provides requested NSSAI (the whole intended S-NSSAIs, including allowed S-NSSAIs and/or rejected NSSAI for the current PLMN and/or rejected NSSAI for the current Registration Area) in the Nudm_SDM_Get message. The requested NSSAI provided to the UDM may include the HPLMN S-NSSAI. If the UE provides the mapped S-NSSAI(s) in the requested NSSAI to the AMF, the AMF includes the mapped S-NSSAI(s) in the Nudm_SDM_Get message. If the UE does not provide the mapped S-NSSAI(s) in the requested NSSAI, the AMF maps the S-NSSAI(s) included in the requested NSSAI to the corresponding HPLMN S-NSSAI(s) based on the subscribed S-NSSAI(s) or service level agreement (SLA) with the HPLMN.

Option B: The AMF provides rejected NSSAI for the current PLMN and/or rejected NSSAI for the current Registration Area which were included in the requested NSSAI in the Nudm_SDM_Get message. The rejected NSSAI provided to the UDM may include the HPLMN S-NSSAI(s). If the UE provides the mapped S-NSSAI(s) in the requested NSSAI to the AMF, the AMF include only the mapped S-NSSAI(s) in the Nudm_SDM_Get message. If the UE does not provide the mapped S-NSSAI(s) in the requested NSSAI, the AMF maps the S-NSSAI(s) rejected by the current PLMN and/or the current Registration Area to the HPLMN S-NSSAI(s) based on the subscribed S-NSSAI or SLA with the HPLMN.

Option C: If the UE included the intended S-NSSAI(s) in an extended (new) IE in the REGISTRATION REQUEST message, the AMF provides the intended S-NSSAI(s) in the extended (new) IE in the Nudm_SDM_Get message. In this case, the AMF may not know the content of the extended IE included in the REGISTRATION REQUEST message. The whole IE is forwarded to the UDM transparently. The intended S-NSSAI(s) may include only the HPLMN S-NSSAI(s) or the pair(s) of HPLMN S-NSSAI and the S-NSSAI for the current PLMN. If the pair(s) of HPLMN S-NSSAI and the S-NSSAI for the current PLMN is included and the AMF can read the content of the extended IE including the intended S-NSSAI, the AMF may transfer only the HPLMN S-NSSAI(s) to the UDM based on related policy of the visited operator.

Step 403*a*: If the information of VPLMNs/access technology and network slice(s) supported by each VPLMN is stored in the UDR, the HPLMN UDM may obtain such information from the UDR and generate the prioritization information of the VPLMNs/access technology with which the UE may register for the network slice(s) included in the requested NSSAI (above Option A) or included in the rejected NSSAI for the current PLMN and/or the rejected NSSAI for the current Registration Area (above Option B) or included in the extended (new) IE (above Option C), or the secured packet.

Step 403*b*: If the information of VPLMNs/access technology and network slice(s) supported by each VPLMN is stored in the AF, the HPLMN UDM may obtain, from the AF, the prioritization information of the VPLMNs/access technology with which the UE may register for the network slice(s) included in the requested NSSAI (above Option A) or included in the rejected NSSAI for the current PLMN and/or the rejected NSSAI for the current Registration Area (above Option B) or included in the extended (new) IE (above Option C), or the available secured packet.

Step 404: The HPLMN UDM to the VPLMN AMF

The HPLMN UDM sends a response for the Nudm_SDM_Get service operation to the VPLMN AMF, wherein the response includes the prioritization information of the VPLMNs/access technology with which the UE may register for the network slice(s) included in the requested NSSAI (above Option A) or included in the rejected NSSAI for the current PLMN and/or the rejected NSSAI for the current Registration Area (above Option B) or included in the extended (new) IE (above Option C).

For the option B, the prioritization information of the VPLMNs/access technology may also include the current/serving PLMN.

Step 404*a*: If the AF is deployed and the AF provides the prioritization information of the VPLMNs/access technology, the AF sends a subscribe request to the UDM to request notification when the UE initiates the registration request including a new requested NSSAI.

Step 404*b*: If the UDM supports providing the prioritization information of the VPLMNs/access technology or obtain it from the AF, the UDM sends a subscribe request to the AMF to request notification when the UE initiates the registration request including a new requested NSSAI.

In an embodiment, if the AMF receives the requested NSSAI or intended S-NSSAIs included in the extended IE from the UE during the registration procedure, the AMF will notify the UDM and, if available, the UDM will notify the AF. The notification includes the slice information as specified in step 402. In order to reduce the notification, the AMF may store the requested NSSAI or intended NSSAI included in the registration request in another embodiment. In this embodiment, the AMF is able to determine whether the requested NSSAI or the intended NSSAI in a subsequent registration request of the UE is different from the stored requested NSSAI or intended NSSAI. If the requested NSSAI or the intended NSSAI in the subsequent registration request changes, the AMF notifies the UDM and, if available, the UDM notifies the AF.

In an embodiment, step 404*a*/404*b* may be performed after step 403*b*/404 or step 408/409, if acknowledge is required from the UE.

Step 405: The VPLMN AMF to the HPLMN UDM

As part of the registration procedure, the VPLMN AMF invokes Nudm_SDM_Subscribe service operation to the HPLMN UDM to subscribe to the notification of updates of the prioritization information of the VPLMNs/access technology with which the UE may register for the intended network slice(s).

Step 406: The VPLMN AMF to the UE

In an embodiment, the prioritization information of the VPLMNs/access technology may be transparent for AMF. That is, when the AMF receives the response including the prioritization information, the AMF sends to the UE in the REGISTRATION ACCEPT message without knowing the content of such information.

Otherwise, the VPLMN AMF sends the received prioritization information of the VPLMNs/access technology to the UE in the REGISTRATION ACCEPT message.

Step 407: The UE to the VPLMN AMF

If the UDM requests an acknowledgement from the UE and the UE verifies that the prioritization information of the VPLMNs/access technology has been provided by the HPLMN, the UE sends a REGISTRATION COMPLETE message to the serving AMF (e.g., VPLMN AMF) with the UE acknowledgement.

Step 408: The VPLMN AMF to the HPLMN UDM

If the UE acknowledgement is received in the REGISTRATION COMPLETE message, the AMF uses the Nudm_SDM_Info service operation to provide the received UE acknowledgement to the UDM.

Step 409: The HPLMN UDM may inform the AF about a successful delivery of the prioritization information of the VPLMNs/access technology.

Step 410: If the UE activates a service/application requiring a network slice not offered by the serving VPLMN but available in the area from other VPLMNs/access technology based on the received prioritization information of the VPLMNs/access technology, and the UE is in automatic network selection mode, then the UE shall attempt to obtain service on a higher priority PLMN with which the UE can register for the network slice.

Figure 5:
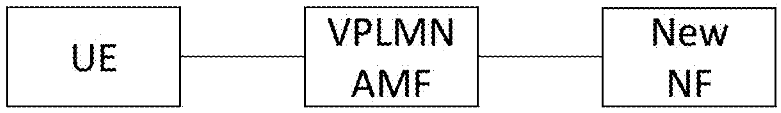
FIG. 5 shows a schematic diagram of a network according to an embodiment of the present disclosure.
Figure 6:
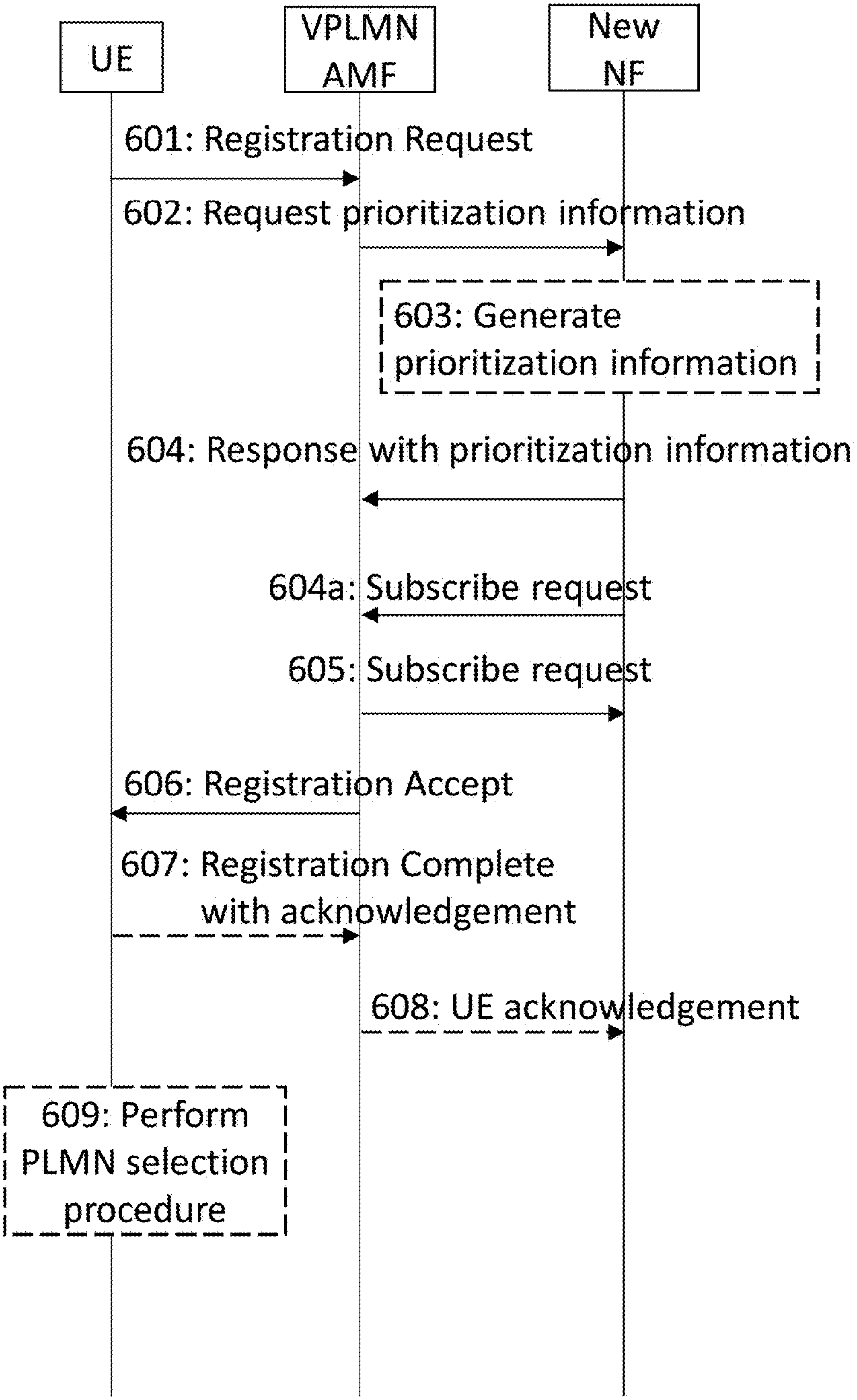
FIG. 6 show a schematic diagram of a registration procedure according to an embodiment of the present disclosure.

In an embodiment, the prioritization information of the VPLMNs/access technology with which the UE may register for the intended Network Slice(s) is provided by a new network function (NF). The new NF is configured to manage the prioritization information of VPLMNs/access technology and network slice(s) supported by each VPLMN. FIG. 5 shows a schematic diagram of a network (architecture) for this embodiment and FIG. 6 shows a schematic diagram of a registration procedure when the prioritization information of the VPLMNs/access technology is provided by the new NF. Note that the new NF may be deployed in the HPLMN and used for VPLMNs/access technology prioritization management based on the slice information.

Specifically, the registration procedure shown in FIG. 6 comprises the following steps.

Step 601: The UE to the VPLMN AMF

The UE initiates an initial registration, an emergency registration or a mobility registration update procedure to the VPLMN AMF by sending a REGISTRATION REQUEST message with the 5GS registration type IE indicating “initial registration”, “emergency registration” or “mobility registration updating”.

The UE includes the requested NSSAI containing the S-NSSAI(s) corresponding to the slice(s) to which the UE intends to register with and includes the mapped S-NSSAI(s) for the requested NSSAI, if available, in the REGISTRATION REQUEST message. The UE may indicate that it supports PLMN reselection based on prioritization information of the VPLMNs/access technology with which the UE may register for the intended network slice(s) in the REGISTRATION REQUEST message.

The UE includes all the S-NSSAIs associated to network slices which the UE intends to register with in the REGISTRATION REQUEST message. There are two options to provide such S-NSSAIs to the network:

Option 1:

The UE may include the intended S-NSSAI(s) in the Requested NSSAI, i.e., the existing IE, and an extended (new) IE in the REGISTRATION REQUEST message. The Requested NSSAI includes the intended S-NSSAIs which are allowed by the serving PLMN or in the Configured NSSAI for the serving PLMN. In this option, an extended (new) IE includes the intended S-NSSAIs, which, e.g., were rejected for the current PLMN and/or rejected for the current Registration Area.

Option 2:

The UE may include all the intended S-NSSAIs in the Requested NSSAI or an extended (new) IE in the REGISTRATION REQUEST message.

Step 602: VPLMN AMF to the new NF

Upon receiving the REGISTRATION REQUEST message, the VPLMN AMF executes a defined registration procedure. As part of the registration procedure, the VPLMN AMF sends a request to the new NF to retrieve the prioritization information of the VPLMNs/access technology.

In an embodiment, the slice information provided by the AMF may not comprise the S-NSSAI(s) which is not allowed by the subscription data of the UE. That is the S-NSSAI(s) which is not allowed by the subscription data of the UE may be excluded from the slice information.

In an embodiment, the S-NSSAI(s) in the slice information provided by the AMF is the HPLMN S-NSSAI(s). In other words, if the S-NSSAI(s) comprised in the REGISTRATION REQUEST message is the VPLMN S-NSSAI(s), the AMF needs to map the VPLMN S-NSSAI(s) to the HPLMN S-NSSAI(s) before providing the slice information.

In an embodiment, there are 3 options for providing the intended S-NSSAIs to the home network:

- Option A: The AMF provides the requested NSSAI (the whole intended S-NSSAIs, including allowed S-NSSAIs and/or the rejected NSSAI for the current PLMN and/or rejected NSSAI for the current Registration Area) in the request message transmitted to the new NF. The requested NSSAI provided to the UDM may include the HPLMN S-NSSAI. If the UE provides the mapped S-NSSAI(s) in the requested NSSAI to the AMF, the AMF includes the mapped S-NSSAI(s) in the request message. If the UE does not provide the mapped S-NSSAI(s) in the requested NSSAI, the AMF maps the S-NSSAI(s) included in the requested NSSAI to the corresponding HPLMN S-NSSAI(s) based on the subscribed S-NSSAI(s) or service level agreement (SLA) with the HPLMN.

Option B: The AMF provides the rejected NSSAI for the current PLMN and/or the rejected NSSAI for the current Registration Area which were included in the requested NSSAI in the request message transmitted to the new NF. The rejected NSSAI provided to the UDM may include the HPLMN S-NSSAI(s). If the UE provides the mapped S-NSSAI(s) in the requested NSSAI to the AMF, the AMF includes only the mapped S-NSSAI(s) in the request message. If the UE does not provide the mapped S-NSSAI(s) in the requested NSSAI, the AMF maps the S-NSSAI(s) rejected by the current PLMN and/or the current Registration Area to the HPLMN S-NSSAI(s) based on the subscribed S-NSSAI or SLA with the HPLMN.

Option C: If the UE includes the intended S-NSSAI(s) in an extended (new) IE in the REGISTRATION REQUEST message, the AMF provides the intended S-NSSAI(s) in the extended (new) IE in the request message transmitted to the new NF. In this case, the AMF may not know the content of the extended IE included in the REGISTRATION REQUEST message. The whole IE is forwarded to the new AF transparently. The intended S-NSSAI(s) may include only the HPLMN S-NSSAI(s) or the pair(s) of HPLMN S-NSSAI and the S-NSSAI for the current PLMN. If the pair(s) of HPLMN S-NSSAI and the S-NSSAI for the current PLMN is included and the AMF can read the content of extended IE including the intended S-NSSAI, the AMF may transfer only the HPLMN S-NSSAI(s) to the new NF based on related policy of the visited operator.

Step 603: The new NF generates the prioritization information of the VPLMNs/access technology with which the UE may register for the network slice(s) included in the requested NSSAI (above Option A) or included in the rejected NSSAI for the current PLMN and/or the rejected NSSAI for the current Registration Area (above Option B) or included in the extended (new) IE (above Option C), or the secured packet.

Step 604: The new NF sends a response to the VPLMN AMF, wherein the response includes the prioritization information of the VPLMNs/access technology with which the UE may register for the network slice(s) included in the requested NSSAI (above Option A) or included in the rejected NSSAI for the current PLMN and/or the rejected NSSAI for the current Registration Area (above Option B) or included in the extended (new) IE (above Option C).

For the option B, the prioritization information of the VPLMNs/access technology may also include the current/serving PLMN.

Step 604*a*: The new NF sends a subscribe request to the AMF to request notification when the UE initiates the registration request including the new requested NSSAI.

In an embodiment, if the AMF receives requested NSSAI or intended S-NSSAIs included in the extended IE during the registration procedure, the AMF will notify the new NF. The notification includes the slice information as specified in step 602.

In an embodiment, in order to reduce the notification, the AMF may store the requested NSSAI or intended NSSAI included in the registration request. The AMF notifies the new NF if the requested NSSAI or the intended NSSAI in a subsequent registration request changes.

Note that step 604*a* may be performed after step 604 or step 608 if acknowledge from the UE is required.

Step 605: The VPLMN AMF to the new NF

The VPLMN AMF invokes a subscribe service operation to the new NF to subscribe to notification of updates of the prioritization information of the VPLMNs/access technology with which the UE may register for the intended network slice(s).

Step 606: The VPLMN AMF to the UE

The prioritization information of the VPLMNs/access technology may be transparent for the AMF. That is, when the AMF receives the response including such information, the AMF sends to the UE in the REGISTRATION ACCEPT message without knowing the content of such information.

Otherwise, the VPLMN AMF sends the received prioritization information of the VPLMNs/access technology to the UE in the REGISTRATION ACCEPT message.

Step 607: The UE to the VPLMN AMF

If the new NF requests an acknowledgement from the UE and the UE verifies the prioritization information of the VPLMNs/access technology, the UE sends the REGISTRATION COMPLETE message to the serving AMF with the UE acknowledgement.

Step 608: The VPLMN AMF to the new NF

If the UE acknowledgement is received in the REGISTRATION COMPLETE message, the AMF provides the received UE acknowledgement to the new NF.

Step 609: If the UE activates a service/application requiring a network slice not offered by the serving VPLMN but available in the area from other VPLMNs/access technology based on the received prioritization information of the VPLMNs/access technology, and the UE is in automatic network selection mode, the UE may attempt to obtain service on a PLMN with which the UE can register for the network slice based on the priority information. For example, based on the prioritization information, the PLMN on which the UE attempts to obtain service may have a higher priority (e.g., the highest priority) compared to other PLMNs with which the UE can register for the network slice.

Figure 7:
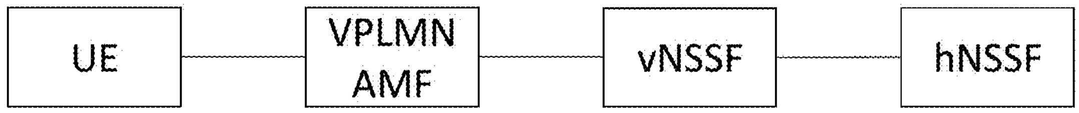
FIG. 7 shows a schematic diagram of a network according to an embodiment of the present disclosure.
Figure 8:
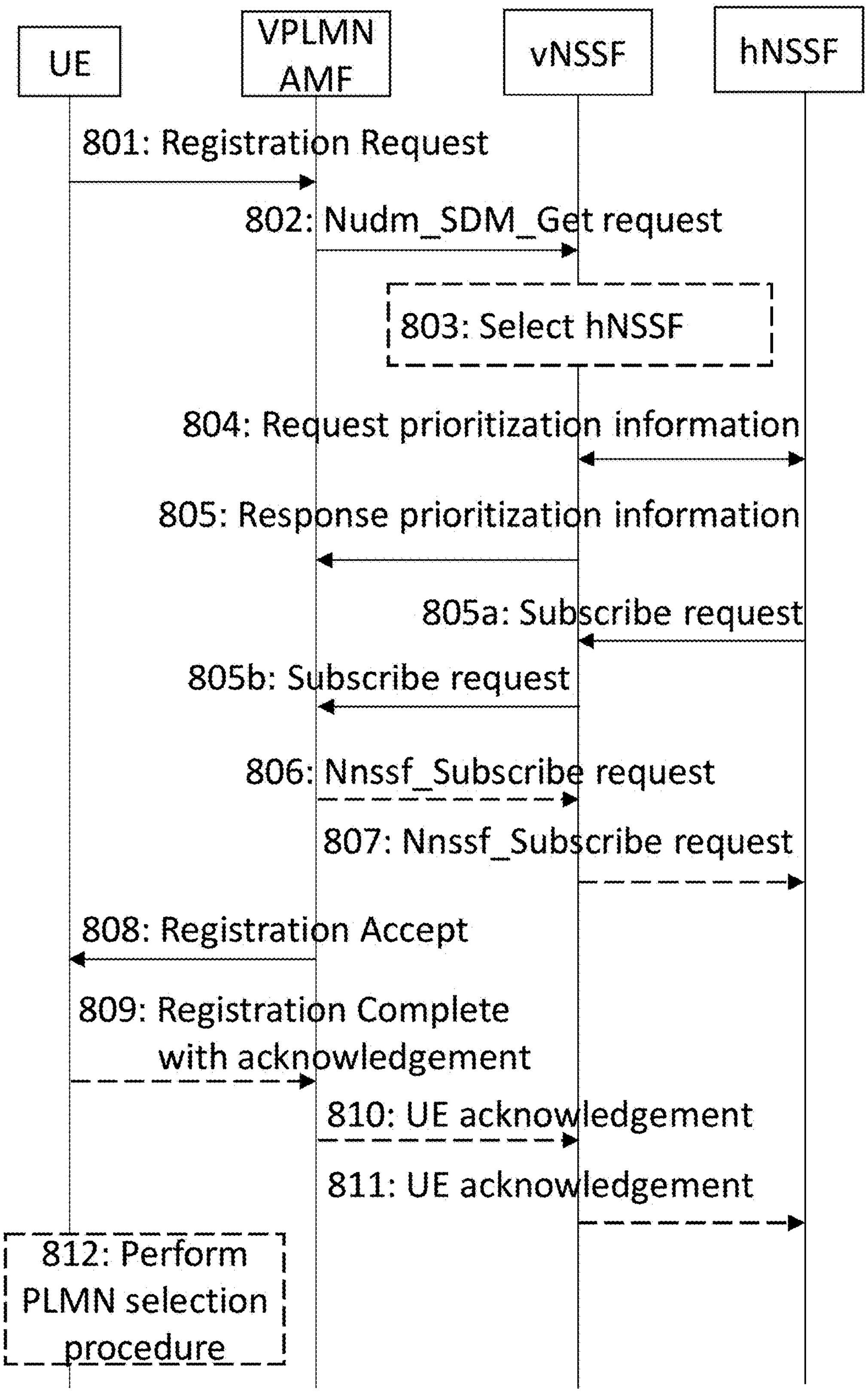
FIG. 8 show a schematic diagram of a registration procedure according to an embodiment of the present disclosure.

In an embodiment, the prioritization information of the VPLMNs/access technology with which the UE may register for the intended Network Slice(s) is provided by the NSSF. In the case of home-routed roaming, there are two options dependent on the choices of the network operators in terms of involvement of the NRF, the NSSF and configuration of the AMF. One option is that the HPLMN and the VPLMN deploy the NSSF separately. The NSSF deployed in the VPLMN is called vNSSF and the NSSF deployed in the HPLMN is called hNSSF. FIG. 7 shows a schematic diagram of a network (architecture) for this embodiment and FIG. 8 shows a schematic diagram of a registration procedure when the prioritization information of the VPLMNs/access technology is provided by the NSSF. The registration procedure shown in FIG. 8 comprises the following steps:

Step 801: The UE to the VPLMN AMF

The UE initiates an initial registration, an emergency registration or a mobility registration update procedure to the VPLMN AMF by sending a REGISTRATION REQUEST message with the 5GS registration type IE indicating "initial registration", "emergency registration" or "mobility registration updating".

The UE includes the requested NSSAI containing the S-NSSAI(s) corresponding to the slice(s) to which the UE intends to register with and includes the mapped S-NSSAI(s) for the requested NSSAI, if available, in the REGISTRATION REQUEST message. The UE may indicate that it supports PLMN reselection based on prioritization information of the VPLMNs/access technology with which the UE may register for the intended network slice(s) in the REGISTRATION REQUEST message.

The UE includes all the S-NSSAIs associated to network slices which the UE intends to register with in the REGISTRATION REQUEST message. There are two options to provide such S-NSSAIs to the network:

Option 1:

The UE may include the intended S-NSSAI(s) in the Requested NSSAI, i.e., the existing IE, and an extended (new) IE in the REGISTRATION REQUEST message. The Requested NSSAI includes the intended S-NSSAIs which are allowed by the serving PLMN or in the Configured NSSAI for the serving PLMN. In this option, an extended (new) IE includes the intended S-NSSAIs, which, e.g., were rejected for the current PLMN and/or rejected for the current Registration Area.

Option 2:

The UE may include all the intended S-NSSAIs in the Requested NSSAI or an extended (new) IE in the REGISTRATION REQUEST message.

Step 802: VPLMN AMF to vNSSF

Upon receiving the REGISTRATION REQUEST message, the VPLMN AMF executes a defined registration procedure. As part of the registration procedure, the VPLMN AMF sends a request to the vNSSF to retrieve the prioritization information of the VPLMNs/access technology.

In order to provide the intended S-NSSAIs to NSSF, one of the following options may be selected:

- Option A: The AMF provides the requested NSSAI (the whole intended S-NSSAIs, including allowed S-NSSAIs and/or rejected NSSAI for the current PLMN and/or rejected NSSAI for the current Registration Area) in the request message to the vNSSF.
- Option B: The AMF provides rejected NSSAI for the current PLMN and/or rejected NSSAI for the current Registration Area which were included in the requested NSSAI in the request message to the vNSSF.
- Option C: If the UE included the intended S-NSSAI(s) in an extended (new) IE in the REGISTRATION REQUEST message, the AMF provides the intended S-NSSAI(s) in the extended (new) IE in the request message to the vNSSF. In this case, the AMF and the vNSSF may not know the content of the extended IE included in the REGISTRATION REQUEST message. The whole IE is forwarded to the hNSSF transparently.

Note that the Nnssf_NSSelection service can be extended or a new Nnssf service may be introduced to carry such information to the vNSSF.

Step 803: The vNSSF selects a hNSSF to retrieve the prioritization information of the VPLMNs/access technology. The NRF may be queried during the hNSSF selection. If there are several level NRFs, the query procedure may involve several levels of NRF according to the network implementation of the network operator. The vNSSF provides the HPLMN S-NSSAI(s) to the hNSSF based on intended S-NSSAI(s) received from the AMF and subscribed S-NSSAI and/or SLA with the HPLMN.

Step 804: vNSSF to hNSSF

After receiving the request from the AMF in step 802, the vNSSF sends a request to the hNSSF selected in step 803 to retrieve the prioritization information of the VPLMNs/access technology. The vNSSF forwards the (slice) information received from the AMF to the hNSSF.

The hNSSF generates the prioritization information of the VPLMNs/access technology with which the UE may register for the network slice(s) included in the requested NSSAI (above Option A) or included in the rejected NSSAI for the current PLMN and/or the rejected NSSAI for the current Registration Area (above Option B) or included in the extended (new) IE (above Option C), or the secured packet.

The hNSSF sends a response to the vNSSF, wherein the response includes the prioritization information of the VPLMNs/access technology with which the UE may register for the network slice(s) included in the requested NSSAI (above Option A) or included in the rejected NSSAI for the current PLMN and/or the rejected NSSAI for the current Registration Area (above Option B) or included in the extended (new) IE (above Option C).

For option B, the prioritization information of the VPLMNs/access technology may also include the current/serving PLMN.

Step 805: The vNSSF to the AMF

The vNSSF forwards the prioritization information of the VPLMNs/access technology to the AMF.

The prioritization information of the VPLMNs/access technology may be transparent for the vNSSF and/or the AMF. That is, when vNSSF and/or AMF receives the response including the prioritization information, the vNSSF and/or the AMF sends to the UE without acknowledging the content of such information.

Step 805*a*: The hNSSF sends a subscribe request to the vNSSF to request notification when the UE initiates the registration request including new requested NSSAI.

Step 805*b*: The vNSSF sends a subscribe request to the AMF to request notification when the UE initiates the registration request including a new requested NSSAI.

In an embodiment, if the AMF receives requested NSSAI during the registration procedure, the AMF will notify the vNSSF and then the vNSSF will notify the hNSSF. The notification includes the slice information as specified in steps 802 and 803.

In an embodiment, in order to reduce the notification, the AMF may store the requested NSSAI or intended NSSAI included in the registration request. The AMF notifies the new NF if the requested NSSAI or the intended NSSAI in a subsequent registration request changes.

Note that steps 805*a*/805*b* may be performed after step 804/805 or step 810/811 if acknowledge from the UE is required.

Step 806: The VPLMN AMF invokes subscribe service operation to the vNSSF to subscribe to notification of updates of the prioritization information of the VPLMNs/access technology with which the UE may register for the intended network slice(s).

Step 807: If the AMF subscribes to notification of updates of the prioritization information of the VPLMNs/access technology from the vNSSF, the vNSSF subscribes to notification of updates of the prioritization information of the VPLMNs/access technology from the hNSSF.

Step 808: The AMF to the UE

The VPLMN AMF may transparently send the received prioritization information of the VPLMNs/access technology to the UE in the REGISTRATION ACCEPT message.

As an alternative, the VPLMN AMF may send the received prioritization information of the VPLMNs/access technology to the UE in the REGISTRATION ACCEPT message.

Step 809: The UE to the VPLMN AMF

If the hNSSF requests an acknowledgement from the UE and the UE verifies the prioritization information of the VPLMNs/access technology, the UE sends the REGISTRATION COMPLETE message to the serving AMF with the UE acknowledgement.

Step 810: The AMF to the vNSSF

If the UE acknowledgement is received in the REGISTRATION COMPLETE message, the AMF provides the received UE acknowledgement to the vNSSF.

Step 811: The vNSSF to the hNSSF

If the UE acknowledgement is received from the AMF, the vNSSF provides the received UE acknowledgement to the hNSSF.

Step 812: If the UE activates a service/application requiring a network slice not offered by the serving VPLMN but available in the area from other VPLMNs/access technology based on the received prioritization information of the VPLMNs/access technology and the UE is in an automatic network selection mode, the UE may attempt to obtain service on a PLMN with which the UE can register for the network slice based on the priority information. For example, based on the prioritization information, the PLMN on which the UE attempts to obtain service may have a higher priority (e.g., the highest priority) compared to other PLMNs with which the UE can register for the network slice.

In an embodiment, the prioritization information of the VPLMNs/access technology with which the UE may register for the intended Network Slice(s) is provided by the PCF in the HPLMN. That is, in this embodiment, the PCF in the HPLMN manages the prioritization information of VPLMNs/access technology and network slice(s) supported by each VPLMN. The architecture for this embodiment and the registration procedure when the prioritization information of the VPLMNs/access technology is provided by the PCF in HPLMN are similar with those shown in FIG. 7 and FIG. 8 (e.g., respectively replacing the vNSSF and the hNSSF with a PCF in VPLMN (i.e., vPCF) and a PCF in HPLMN (i.e., hPCF)).

Specifically, the mechanism of query and subscription to notification, between the AMF, vPCF and hPCF are similar to that shown in FIG. 8 including information provided by the AMF, the prioritization information of the VPLMNs/access technology returned by the hPCF, the acknowledge returned by the UE, and the subscription of the notification for the change in the requested NSSAI or intended NSSAI from the UE.

In the present disclosure, the AMF provides the HPLMN S-NSSAI(s) to the UDM or new NF (see, e.g., FIGS. 4 and 6). In addition, the vPCF/vNSSF provides the HPLMN S-NSSAI(s) to the hPCF/hNSSF (see FIG. 8).

Furthermore, the UDM/AF, new NF, the hNSSF/vNSSF or the hPCF/vPCF subscribes to the notification for the change in the requested NSSAI or intended NSSAI from the UE.

Figure 9:
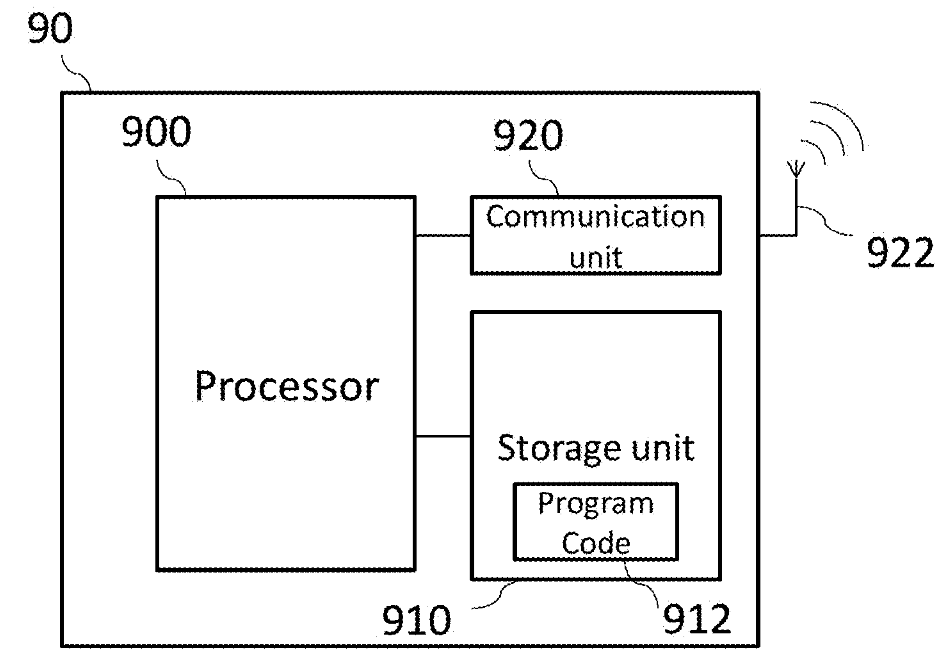
FIG. 9 shows an example of a schematic diagram of a wireless terminal according to an embodiment of the present disclosure.

FIG. 9 relates to a schematic diagram of a wireless terminal 90 according to an embodiment of the present disclosure. The wireless terminal 90 may be a user equipment (UE), a mobile phone, a laptop, a tablet computer, an electronic book or a portable computer system and is not limited herein. The wireless terminal 90 may include a processor 900 such as a microprocessor or Application Specific Integrated Circuit (ASIC), a storage unit 910 and a communication unit 920. The storage unit 910 may be any data storage device that stores a program code 912, which is accessed and executed by the processor 900. Embodiments of the storage unit 912 include but are not limited to a subscriber identity module (SIM), read-only memory (ROM), flash memory, random-access memory (RAM), hard-disk, and optical data storage device. The communication unit 920 may a transceiver and is used to transmit and receive signals (e.g., messages or packets) according to processing results of the processor 900. In an embodiment, the communication unit 920 transmits and receives the signals via at least one antenna 922 shown in FIG. 9.

In an embodiment, the storage unit 910 and the program code 912 may be omitted and the processor 900 may include a storage unit with stored program code.

The processor 900 may implement any one of the steps in exemplified embodiments on the wireless terminal 90, e.g., by executing the program code 912.

The communication unit 920 may be a transceiver. The communication unit 920 may as an alternative or in addition be combining a transmitting unit and a receiving unit configured to transmit and to receive, respectively, signals to and from a wireless network node (e.g., a base station).

Figure 10:
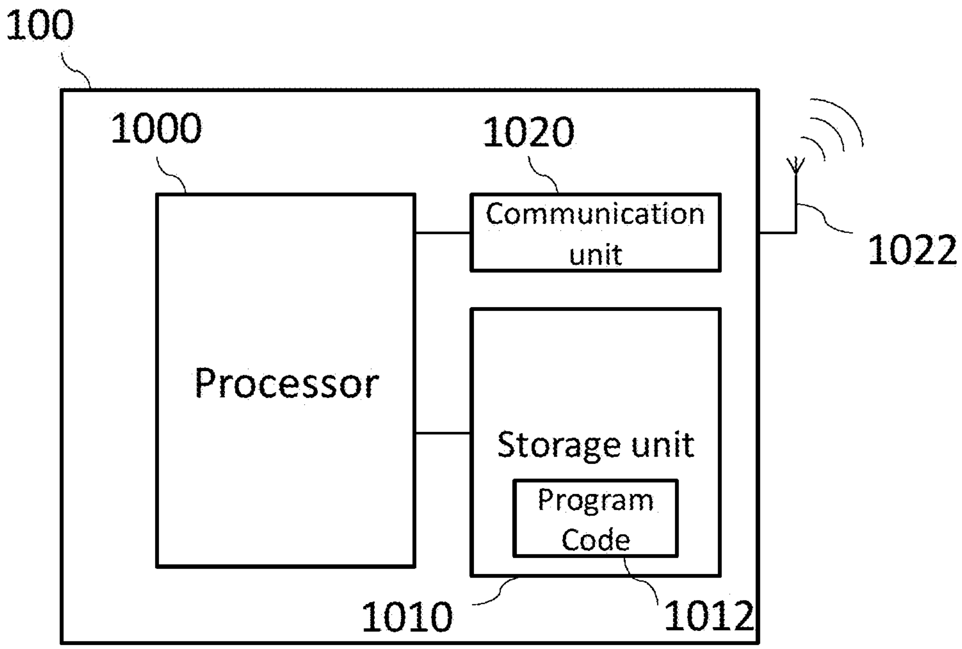
FIG. 10 shows an example of a schematic diagram of a wireless network node according to an embodiment of the present disclosure.

FIG. 10 relates to a schematic diagram of a wireless network node 100 according to an embodiment of the present disclosure. The wireless network node 100 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 100 may comprise (perform) at least one network function such as an access and mobility management function (AMF), a session management function (SMF), a user place function (UPF), a policy control function (PCF), an application function (AF), etc. The wireless network node 100 may include a processor 1000 such as a microprocessor or ASIC, a storage unit 1010 and a communication unit 1020. The storage unit 1010 may be any data storage device that stores a program code 1012, which is accessed and executed by the processor 1000. Examples of the storage unit 1012 include but are not limited to a SIM, ROM, flash memory, RAM, hard-disk, and optical data storage device. The communication unit 1020 may be a transceiver and is used to transmit and receive signals (e.g., messages or packets) according to processing results of the processor 1000. In an example, the communication unit 1020 transmits and receives the signals via at least one antenna 1022 shown in FIG. 10.

In an embodiment, the storage unit 1010 and the program code 1012 may be omitted. The processor 1000 may include a storage unit with stored program code.

The processor 1000 may implement any steps described in exemplified embodiments on the wireless network node 100, e.g., via executing the program code 1012.

The communication unit 1020 may be a transceiver. The communication unit 1020 may as an alternative or in addition be combining a transmitting unit and a receiving unit configured to transmit and to receive, respectively, signals to and from a wireless terminal (e.g., a user equipment or another wireless network node).

Figure 11:
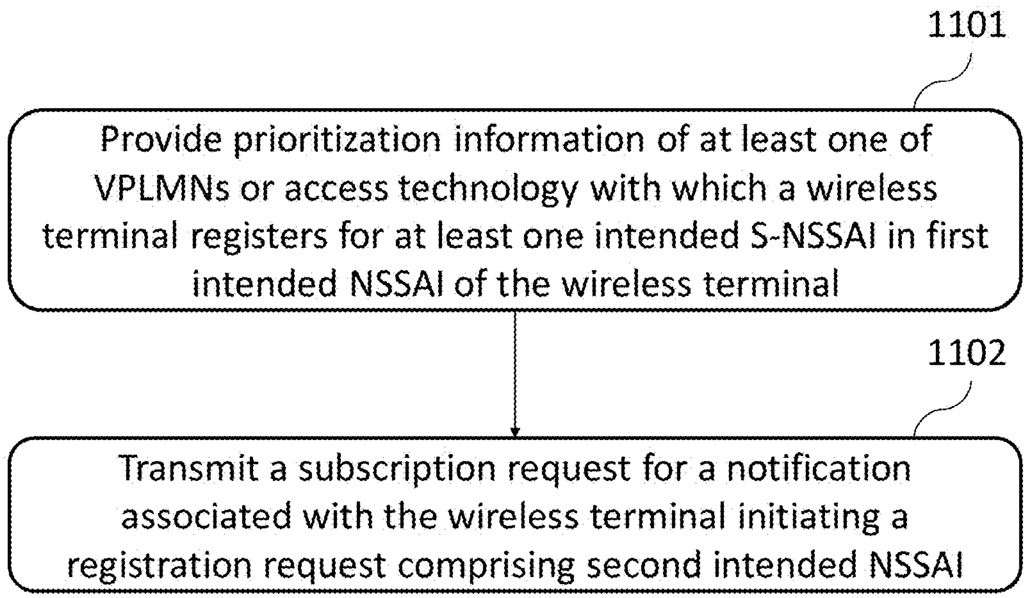
FIGS. 11 and 12 shows flowcharts of methods according to embodiments of the present disclosure.

FIG. 11 shows a flowchart of a method according to an embodiment of the present disclosure. The method shown in FIG. 11 may be used in a wireless network node and comprises the following steps:

Step 1101: Provide prioritization information of at least one of VPLMNs or access technology with which a wireless terminal registers for at least one intended S-NSSAI in a first intended NSSAI of the wireless terminal.

Step 1102: Transmit a subscription request for a notification associated with the wireless terminal initiating a registration request comprising a second intended NSSAI.

In the method shown in FIG. 11, the wireless network node provides prioritization information of at least one of VPLMNs or access technology with which a wireless terminal (e.g., UE) registers for at least one intended S-NSSAI. The at least one intended S-NSSAI is comprised in a first intended NSSAI of the wireless terminal. After providing the prioritization information, the wireless network node transmits a subscription/subscribe request for a notification associated with the wireless terminal initiating a registration request comprising second intended NSSAI. In other words, the wireless network node subscribes to a notification for the wireless terminal initiating the registration request comprising new intended NSSAI. Note that the new intended NSSAI may be new in respect of time. That is, if the wireless terminal initiates any registration request comprising the second intended NSSAI after registering with the first intended NSSAI, the wireless network node receives the corresponding notification because of the subscription request. As an alternative, the new intended NSSAI may be new when the second intended NSSAI is different from the first intended NSSAI. In this embodiment, the wireless network node receives the corresponding notification if the wireless terminal initiates the registration request comprising the second intended NSSAI and the second intended NSSAI is different from the first intended NSSAI.

In an embodiment, the wireless network node is/comprises an AF in the HPLMN of the wireless terminal. In this embodiment, the prioritization information is provided to and the subscription request is transmitted to a UDM in the HPLMN (see FIG. 4).

In an embodiment, the wireless network node is/comprises an NSSF in the HPLMN of the wireless terminal (i.e., hNSSF). In this embodiment, the prioritization information is provided to and the subscription request is transmitted to an NSSF in a VPLMN serving the wireless terminal (i.e., vNSSF). Note that, each of the at least one intended S-NSSAI received from the vNSSF may be S-NSSAI of the HPLMN.

In an embodiment, the wireless network node is/comprises a PCF in the HPLMN of the wireless terminal. In this embodiment, the prioritization information is provided to and the subscription request is transmitted to a PCF in the VPLMN serving the wireless terminal. Note that, each of the at least one intended S-NSSAI received from the PCF in the VPLMN may be S-NSSAI of the HPLMN.

In an embodiment, the prioritization information is provided to and the subscription request is transmitted to an AMF in the VPLMN serving the wireless terminal. For example, the wireless network node may be/comprise the UDM, the new NF configured to manage the prioritization information (see FIGS. 5 and 6), the NSSF or the PCF.

In an embodiment of the wireless network node being/comprising the UDM, the wireless network node may receive the subscription request for the notification associated with the wireless terminal initiating the registration request comprising the second intended NSSAI from the AF.

In an embodiment of the wireless network node being/comprising the UDM, the wireless network node may receive at least one S-NSSAI of the HPLMN corresponding to the at least one intended S-NSSAI, e.g., for registration. That is, the at least one intended S-NSSAI received by the wireless network node (for registration) is the HPLMN S-NSSAI.

In an embodiment of the wireless network node being/comprising the UDM, the wireless network node may receive the at least one intended S-NSSAI together with at least one S-NSSAI of the HPLMN corresponding to the at least one intended S-NSSAI.

In an embodiment of the wireless network node being/comprising the NSSF or the PCF in the VPLMN, the wireless network node transmits, to the NSSF or the PCF in the HPLMN, at least one S-NSSAI of the HPLMN corresponding to the at least one intended S-NSSAI. That is the wireless network node transmits (only) the HPLMN S-NSSAI(s) as the at least one intended S-NSSAI, to request the prioritization information.

In an embodiment of the wireless network node being/comprising the NSSF or the PCF in the VPLMN, the wireless network node receives, from the NSSF or the PCF in the HPLMN, the subscription request for the notification of the wireless terminal initiating the registration request comprising the second intended NSSAI.

In an embodiment, the first intended NSSAI and/or the second intended NSSAI comprises at least one allowed S-NSSAI allowed by the VPLMN serving the wireless terminal and/or at least one configured S-NSSAI for the VPLMN serving the wireless terminal.

In an embodiment, the first intended NSSAI and/or the second intended S-NSSAI may (further) comprise at least one rejected S-NSSAI rejected by the VPLMN serving the wireless terminal and/or the registration area of the wireless terminal.

In an embodiment, the at least one intended S-NSSAI comprises the whole intended S-NSSAIs (including allowed S-NSSAIs and/or rejected S-NSSAI for the current PLMN and/or rejected S-NSSAI for the current Registration Area). For more details, it is referred to Option A in step 402/602/802.

In an embodiment, the at least one intended S-NSSAI may comprise at least one S-NSSAI rejected by the VPLMN serving the wireless terminal and/or the registration area of the wireless terminal (in the first intended NSSAI). More details can be referred to Option B in step 402/602/802.

In an embodiment, the at least one intended S-NSSAI provided to the wireless network node may comprise all of S-NSSAIs requested by the wireless terminal (e.g., S-NSSAIs in the first intended NSSAI). More details can be referred to Option C in step 402/602/802.

In the present disclosure, the wireless network node is/comprises an NF represents that the wireless network node performs at least part of functionalities of the NF.

In the present disclosure, the subscription request may be equal to a subscribe request.

Figure 12:
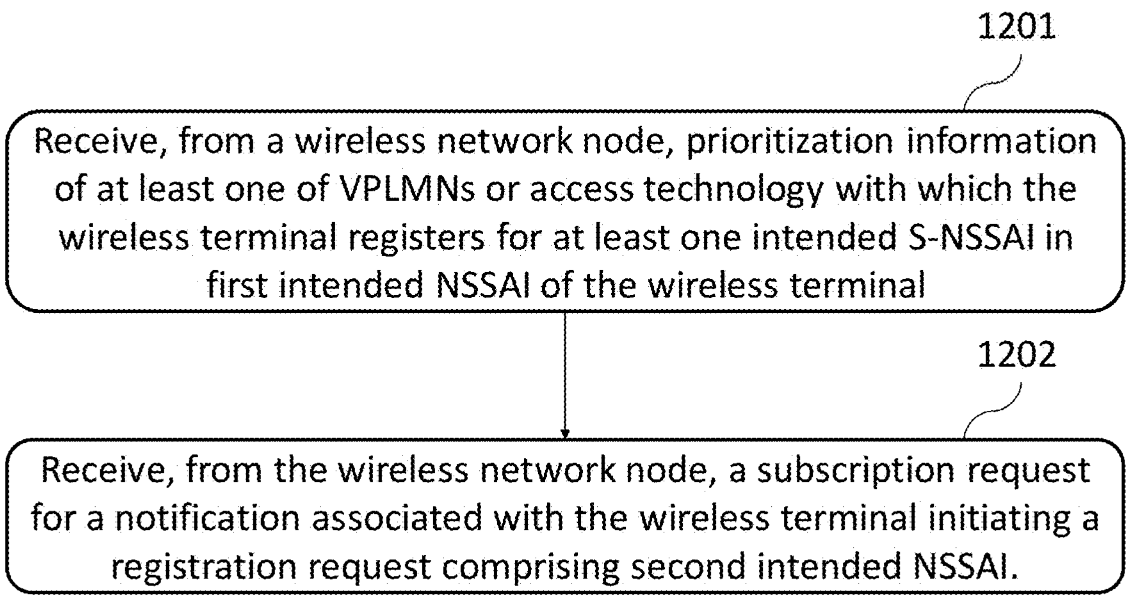

FIG. 12 shows a flowchart of a method according to an embodiment of the present disclosure. The method shown in FIG. 12 may be used in an AMF (e.g., a wireless network node comprising the AMF) in a VPLMN serving a wireless terminal (e.g., UE) and comprises the following steps:

Step 1201: Receive, from a wireless network node, prioritization information of at least one of VPLMNs or access technology with which the wireless terminal registers for at least one intended S-NSSAI in first intended NSSAI of the wireless terminal.

Step 1202: Receive, from the wireless network node, a subscription request for a notification associated with the wireless terminal initiating a registration request comprising second intended NSSAI.

In FIG. 12, the AMF receives, from a wireless network node, prioritization information of at least one of VPLMNs or access technology with which the wireless terminal registers for at least one intended S-NSSAI. The at least one intended S-NSSAI is comprised in a first intended NSSAI of (e.g., received from) the wireless terminal. After receiving the prioritization information, the AMF further receives a subscription/subscribe request for a notification associated with the wireless terminal initiating a registration request comprising second intended NSSAI. In other words, the wireless network node subscribes to a notification for the wireless terminal initiating the registration request comprising new intended NSSAI. Note that the new intended NSSAI may be new in respect of time. That is, if the wireless terminal initiates any registration request comprising the second intended NSSAI after registering with the first intended NSSAI, the AMF transmits the corresponding notification based on the subscription request. As an alternative, the new intended NSSAI may be new when the second intended NSSAI is different from the first intended NSSAI. In this embodiment, the AMF transmits the corresponding notification if the wireless terminal initiates the registration request comprising the second intended NSSAI different from the first intended NSSAI.

In an embodiment, the wireless network node is/comprises the UDM in the HPLMN of the wireless terminal or a (new) NF configured to manage the prioritization information. In this embodiment, the AMF may transmit, to the wireless network node, at least one S-NSSAI of the HPLMN corresponding to the at least one intended S-NSSAI. That is the AMF transmits, to the wireless network node, the HPLMN S-NSSAI(s) as the at least one intended S-NSSAI, for registration and/or for requesting the prioritization information. As an alternative, the AMF may transmit, to the wireless network node, the at least one intended S-NSSAI and at least one S-NSSAI of the HPLMN corresponding to the at least one intended S-NSSAI. That is the AMF transmits, to the wireless network node, the at least one intended S-NSSAI together with corresponding HPLMN S-NSSAI(s), for registration and/or for requesting the prioritization information.

In an embodiment, the AMF may need to map each of the at least one intended S-NSSAI to corresponding HPLMN S-NSSAI, e.g., if the wireless terminal transmits VPLMN S-NSSAI(s) to the AMF for registration.

In an embodiment, the wireless network node is/comprises the NSSF in the VPLMN serving the wireless terminal (i.e., vNSSF shown in FIGS. 7 and 8) or the PCF in the VPLMN serving the wireless terminal. In this embodiment, the wireless network node transmits, to the wireless network node, at least one S-NSSAI of the HPLMN corresponding to the at least one intended S-NSSAI. That is the AMF transmits, to the wireless network node transmits the HPLMN S-NSSAI(s) as the at least one intended S-NSSAI, to request the prioritization information.

In an embodiment, the AMF receives the first intended NSSAI from the wireless terminal, e.g., for registration and/or in a registration request.

In an embodiment, the first intended NSSAI and/or the second intended NSSAI comprises at least one allowed S-NSSAI allowed by the VPLMN serving the wireless terminal and/or at least one configured S-NSSAI for the VPLMN serving the wireless terminal.

In an embodiment, the first intended NSSAI and/or the second intended S-NSSAI may (further) comprise at least one rejected S-NSSAI rejected by the VPLMN serving the wireless terminal and/or the registration area of the wireless terminal.

In an embodiment, the at least one intended S-NSSAI comprises the whole intended S-NSSAIs (including allowed S-NSSAIs and/or rejected S-NSSAI for the current PLMN and/or rejected S-NSSAI for the current Registration Area). More details can be referred to Option A in step 402/602/802.

In an embodiment, the at least one intended S-NSSAI may comprise at least one S-NSSAI rejected by the VPLMN serving the wireless terminal and/or the registration area of the wireless terminal (in the first intended NSSAI). More details can be referred to Option B in step 402/602/802.

In an embodiment, the at least one intended S-NSSAI provided to the wireless network node may comprise all of S-NSSAIs requested by the wireless terminal (e.g., S-NSSAIs in the first intended NSSAI). More details can be referred to Option C in step 402/602/802.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of the claims. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless network node, the method comprising:

providing prioritization information of at least one of Visitor Public Land Mobile Networks (VPLMNs), or access technology with which a wireless terminal registers for at least one intended Single-network slice Selection Assistant Information (S-NSSAI) in first intended network slice Selection Assistant Information (NSSAI) of the wireless terminal;

transmitting a subscription request for a notification associated with the wireless terminal initiating a registration request comprising second intended NSSAI; and receiving, from an application function in a Home Public Land Mobile Network (HPLMN), the subscription request, wherein:

the prioritization information is provided to and the subscription request is transmitted to an access and mobility management function (AMF), in a VPLMN serving the wireless terminal, and the wireless network node comprises a unified data management in the HPLMN of the wireless terminal.

2. The wireless communication method of claim 1, wherein the second intended NSSAI is different from the first intended NSSAI.

3. The wireless communication method of claim 1, wherein the wireless network node comprises a Network Slice Selection Function (NSSF) in a Home Public Land Mobile Network (HPLMN) of the wireless terminal, wherein the prioritization information is provided to and the subscription request is transmitted to an NSSF in a VPLMN serving the wireless terminal, the wireless communication method further comprising:

receiving, from the NSSF in the VPLMN serving the wireless terminal, at least one S-NSSAI of the HPLMN corresponding to the at least one intended S-NSSAI.

4. The wireless communication method of claim 1, wherein the wireless network node comprises a Policy Control Function (PCF) in a Home Public Land Mobile Network (HPLMN) of the wireless terminal, wherein the prioritization information is provided to and the subscription request is transmitted to a PCF in a VPLMN serving the wireless terminal, the wireless communication method further comprising:

receiving, from the PCF in the VPLMN serving the wireless terminal, at least one S-NSSAI of the HPLMN corresponding to the at least one intended S-NSSAI.

5. The wireless communication method of claim 1, further comprising:

receiving, from the AMF, at least one S-NSSAI of the HPLMN corresponding to the at least one intended S-NSSAI, or receiving, from the AMF, the at least one intended S-NSSAI and at least one S-NSSAI of the HPLMN corresponding to the at least one intended S-NSSAI.

6. The wireless communication method of claim 1, wherein the wireless network node comprises an NSSF in the VPLMN serving the wireless terminal or a PCF in the VPLMN serving the wireless terminal.

7. The wireless communication method of claim 6, further comprising:

transmitting, to a home network function in an HPLMN of the wireless terminal, at least one S-NSSAI of the HPLMN corresponding to the at least one intended S-NSSAI, wherein the home network function is a PCF and the wireless network node comprises the PCF in the VPLMN serving the wireless terminal, or the home network function is an NSSF and the wireless network node comprises the NSSF in the VPLMN serving the wireless terminal.

8. The wireless communication method of claim 6, further comprising:

receiving, from a home network function in an HPLMN of the wireless terminal, the subscription request, wherein the home network function is a PCF and the wireless network node comprises the PCF in the VPLMN serving the wireless terminal, or the home network function is an NSSF and the wireless network node comprises the NSSF in the VPLMN serving the wireless terminal.

9. The wireless communication method of claim 1, wherein at least one of:

the first intended NSSAI and/or the second intended NSSAI comprises at least one allowed S-NSSAI allowed by a VPLMN serving the wireless terminal and/or at least one configured S-NSSAI for the VPLMN serving the wireless terminal, or at least one of the first intended NSSAI or the second intended S-NSSAI comprises at least one rejected S-NSSAI rejected by a VPLMN serving the wireless terminal and/or a registration area of the wireless terminal.

10. The wireless communication method of claim 1, wherein at least one of:

the at least one intended S-NSSAI comprises at least one rejected S-NSSAI rejected by a VPLMN serving the wireless terminal and/or a registration area of the wireless terminal, or the at least one intended S-NSSAI comprises all of S-NSSAIs requested by the wireless terminal.

11. A wireless communication method for use in an access and mobility management function in a Visitor Public Land Mobile Network (VPLMN) serving a wireless terminal, the wireless communication method comprising:

receiving, from a wireless network node, prioritization information of at least one of VPLMNs, or access technology with which the wireless terminal registers for at least one intended Single-network slice Selection Assistant Information (S-NSSAI) in first intended network slice Selection Assistant Information, NSSAI, of the wireless terminal;

receiving, from the wireless network node, a subscription request for a notification associated with the wireless terminal initiating a registration request comprising second intended NSSAI, wherein the wireless network node comprises a unified data management in a Home Public Land Mobile Network (HPLMN) of the wireless terminal; and receiving the subscription request in a VPLMN serving the wireless terminal, the subscription request obtained via the wireless network node from an application function in the HPLMN.

12. The wireless communication method of claim 11, wherein the second intended NSSAI is different from the first intended NSSAI.

13. The wireless communication method of claim 12, further comprising:

transmitting, to the wireless network node, at least one S-NSSAI of the HPLMN corresponding to the at least one intended S-NSSAI, or transmitting, to the wireless network node, the at least one intended S-NSSAI and at least one S-NSSAI of the HPLMN corresponding to the at least one intended S-NSSAI, the wireless communication method further comprising:

mapping each of the at least one intended S-NSSAI to the corresponding S-NSSAI of the HPLMN of the wireless terminal.

14. The wireless communication method of claim 11, wherein the wireless network node comprises an NSSF in a VPLMN serving the wireless terminal or a PCF in the VPLMN serving the wireless terminal, the wireless communication method further comprising at least one of:

transmitting, to the wireless network node, at least one S-NSSAI of the HPLMN corresponding to the at least one intended S-NSSAI; and/or the wireless communication method further comprising:

receiving, from the wireless terminal, the first intended NSSAI.

15. The wireless communication method of claim 11, wherein at least one of:

the first intended NSSAI and/or the second intended NSSAI comprises at least one allowed S-NSSAI allowed by the VPLMN serving the wireless terminal and/or at least one configured S-NSSAI for the VPLMN serving the wireless terminal; or the first intended NSSAI and/or the second intended S-NSSAI comprises at least one rejected S-NSSAI rejected by the VPLMN serving the wireless terminal and/or a registration area of the wireless terminal.

16. The wireless communication method of claim 11, wherein at least one of:

the at least one intended S-NSSAI comprises at least one rejected S-NSSAI rejected by the VPLMN serving the wireless terminal and/or a registration area of the wireless terminal; or the at least one intended S-NSSAI comprises all of S-NSSAIs requested by the wireless terminal.

* * * * *